United States Patent [19]

Strohschein

[11] Patent Number: 5,516,424
[45] Date of Patent: May 14, 1996

[54] FUEL INJECTION VALVE

[75] Inventor: Heinrich Strohschein, Oberhaid, Germany

[73] Assignee: Robert Bosch GmbH, Stuttgart, Germany

[21] Appl. No.: 283,870

[22] Filed: Aug. 1, 1994

[30] Foreign Application Priority Data

Jul. 31, 1993 [DE] Germany .......................... 43 25 842.5

[51] Int. Cl.⁶ .................................................. B01D 35/02
[52] U.S. Cl. .......................... 210/232; 210/429; 210/445; 210/450; 210/485; 210/499; 137/544; 239/575; 239/DIG. 23
[58] Field of Search ....................... 210/418, 429, 210/445, 450, 452, 453, 460, 461, 463, 485, 495, 474, 497.01, 499, 232, 477; 239/575, 590, DIG. 23; 251/129.21; 137/544, 550

[56] References Cited

U.S. PATENT DOCUMENTS

| | | | |
|---|---|---|---|
| 4,700,891 | 10/1987 | Hans et al. | 239/132.5 |
| 4,946,107 | 8/1990 | Hunt | 239/585 |
| 5,275,341 | 1/1994 | Romann et al. | 239/585.4 |
| 5,330,153 | 7/1994 | Reiter | 251/129.21 |
| 5,330,649 | 7/1994 | Hafner | 210/430 |
| 5,356,079 | 10/1994 | Rahbar | 239/585.1 |

FOREIGN PATENT DOCUMENTS

| | | |
|---|---|---|
| 0348786 | 1/1990 | European Pat. Off. . |
| 0480610 | 4/1992 | European Pat. Off. . |
| 3535124 | 4/1987 | Germany . |
| 3935733 | 5/1990 | Germany . |
| 4003228 | 8/1991 | Germany . |
| 2225383 | 5/1990 | United Kingdom . |
| WO94/25748 | 11/1994 | WIPO . |

OTHER PUBLICATIONS

Patent Abstracts of Japan, vol. 18, No. 352 (M–1631), 4 Jul. 1994, (Honda Motor Co. Ltd.).

*Primary Examiner*—Matthew O. Savage
*Attorney, Agent, or Firm*—Kenyon & Kenyon

[57] ABSTRACT

A fuel injection valve has a fuel filter developed as one piece with a holding collar. The holding collar extends radially beyond the fuel inlet connection and has a nose outside the fuel inlet connection. The circumferential nose of the holding collar together with the groove on the outer circumference of the fuel inlet connection forms a detent connection by which the fuel filter is fastened in pin-pointed position. Between the base body of the fuel filter and the inner wall of the fuel inlet connection there is merely a clearance fit, so that formation of chips is avoided within the fuel injection valve. The fuel injection valve is particularly suitable for use in fuel injection systems of mixture-compressing external-ignition internal combustion engines.

8 Claims, 4 Drawing Sheets

FUEL INJECTION VALVE

BACKGROUND OF THE INVENTION

German Patent Application No. OS 40 03 228 shows a fuel injection valve in which a fuel filter is forced into a fuel inlet connection at a feed end of the fuel injection valve. The fuel filter is provided on its circumference with, for instance, a brass ring which, together with the wall of a fuel inlet connection, forms a pair for the pressing-in of the fuel filter. The pressing of the fuel filter into the fuel inlet connection, however, has disadvantages. For example, in the case of large numbers, there is the danger that the rams do not act uniformly so that a pin-pointed forcing-in press is not possible. With this known type of mounting of the fuel filter there is the disadvantageous possibility of the fuel filter being forced in too far, or the danger of the fuel filter protruding because of insufficient pressing forces.

In particular, the above method has the disadvantage of possibly producing abrasion and chips which can be stripped off upon the pressing as a result of the force fit between the fuel filter and the fuel inlet connection, thereby dirtying the fuel injection valve. Removal of a fuel filter which has been forced into position is practically impossible, since this would entail considerable damage to the fuel injection valve and/or the fuel filter.

In order to hold an O-ring provided at the feed end of the fuel injection valve during the molding around the fuel injection valve, an O-ring holding collar which is separate from the plastic covering is produced as an additional part. The groove formed between the plastic covering, fuel inlet connection, and O-ring holding collar receives the O-ring. The mounting of the O-ring is critical insofar as it must be widened in order to be able to slip over the O-ring-holding collar.

Another disadvantage of the above fuel filter is that, in order to produce the plastic base body of the fuel filter, the sprue must be provided on the so-called clean side upon the injection molding and therefore in the inner region of the fuel filter.

European Patent No. EP 0 348 786 shows a fuel injection valve in which a fuel filter is forced into the fuel inlet connection on the feed end of the fuel injection valve. As a result, all the disadvantages connected with the pressing-in which have been discussed above are present in this valve as well. As the holding collar for the sealing ring, an annular disk is used which is inserted as an additional structural part in a groove on the circumference of the fuel inlet connection. In addition to the undetachable force-fit of the fuel filter, the fuel filter is, for instance, fastened by a flange connection on the fuel inlet connection upstream of the holding collar.

European Patent Application No. EP 0 480 610 describes a fuel injection valve which contains a fuel filter which is forced in place into the fuel inlet connection. Accordingly, all the above-mentioned disadvantages inherent in the forcing in place of the fuel filter can also be present here. As a holding collar, the fuel inlet connection is provided with a curved end so that no additional structural part is required in order to hold the O-ring. A considerable disadvantage results from this in any event since the O-ring must either be widened extremely in order to be able to be pulled over the bent fuel inlet connection, or the shaping of the fuel inlet connection must take place after the mounting, which is particularly disadvantageous.

Fuel filters which are developed together with a shoulder as holding collar for the sealing ring are known from German Patent Application No. OS 39 35 733. The embodiments described therein have the same disadvantages as result from the forcing-in method. The shoulder, which is developed on the fuel filter, serves as a resting surface for the fuel filter on the upstream end of the fuel inlet connection and for the holding of the sealing ring, but it in no way guarantees a dependable attachment of the fuel filter on the fuel injection valve. Therefore, disadvantageous brass-ring members or plastic-ring parts are fastened on the screens which form a part of the pairing of the force-fit with the fuel inlet connection. In this case there is also a great danger of the formation of abrasion and chips which can result in a dirtying which is extremely injurious to the operation of the fuel injection valve. Upon the forcing-in, relatively large pressures must be applied in order to ensure that the shoulder actually rests on the fuel inlet connection. A non-destructive removal of the fuel filter is accordingly impossible. A particular disadvantage of this arrangement is the considerable expense for the manufacture of the fuel filter, the shoulder of which is formed, for instance, by a plurality of disks into which a flange of the screen is inserted. In another embodiment, an additional ring is introduced into the shoulder, which also results in an additional expense.

SUMMARY OF THE INVENTION

The fuel injection valve according to the present invention has the advantages that the fuel filter is produced in a particularly inexpensive and material-saving manner, and the attachment of the fuel filter on the fuel inlet connection is effected by a form-locked connection which avoids the formation of chips by means of a holding collar which is developed as a single part with the fuel filter and has a nose on the so-called dirty side of the fuel injection valve. Moreover, a clearance fit is present between the fuel filter and the inner wall of the fuel inlet connection, as a result of which abrasion is prevented.

A simplified mounting of the fuel filter which results from the geometrical arrangement of the fuel filter according to the present invention is particularly advantageous. When the fuel filter is pressed onto the feed end of the fuel injection valve, only very slight forces need be applied in order to cause a nose on the holding collar to engage a groove on the circumference of the fuel inlet connection. This force can easily be applied, for example, by the finger of one's hand. Due to the engagement on the outer circumference of the fuel inlet connection, there is no forcing in place, and therefore no danger of the formation of chips within the fuel inlet connection. The fuel filter according to the present invention, in addition to being easily mounted, is also removable. Using a simple mechanical tool, for instance, a claw, the nose of the fuel filter can be lifted, without damage, out of the groove and the entire fuel filter can thus be removed from the fuel inlet connection. In this way, there can be no dirtying or damage on the so-called clean side, and therefore on the inside of the fuel inlet connection.

In accordance with a further embodiment of the present invention, due to the groove arranged on the fuel inlet connection, the fuel filter can be installed with great accuracy in pin-pointed position. Particularly in the case of large numbers, this results in high process reliability.

From a manufacturing standpoint, it is particularly advantageous that, upon the injection molding of the plastic body of the fuel filter, the sprue can be present on the dirty side, and therefore in a region which need not fulfill any functions in the installed condition and which lies outside of the fuel inlet connection.

DETAILED DESCRIPTION OF THE INVENTION

Figure 1:
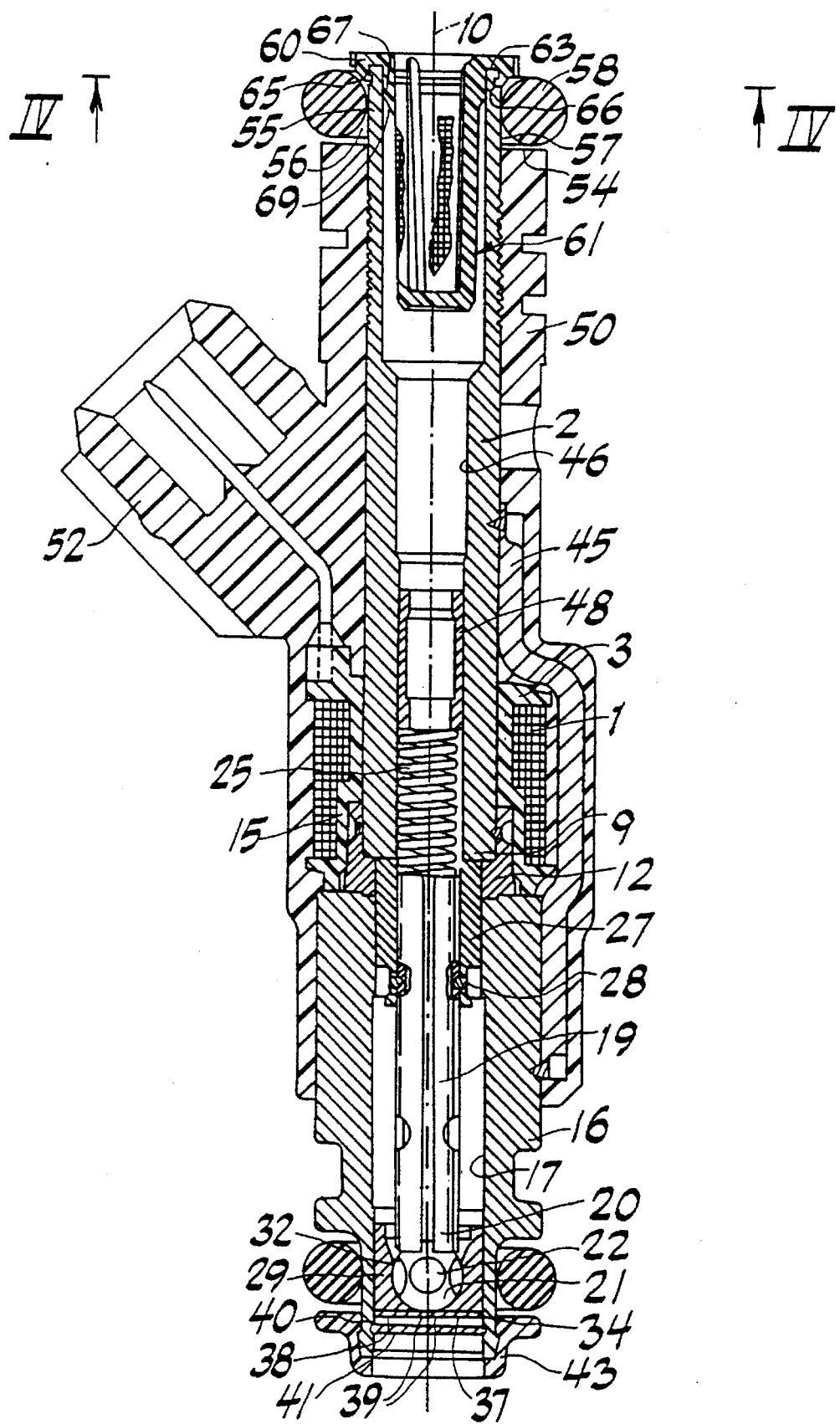
FIG. 1 shows a fuel injection valve having a fuel filter in accordance with the present invention.

An electromagnetically actuatable valve in the form of an injection valve for fuel injection systems of mixture-compressing, external-ignition internal combustion engines, which is shown by way of example in FIG. 1, has a tubular core 2 which serves as fuel inlet connection and is surrounded by a magnetic coil 1, the core having, for instance, a constant outside diameter over its entire length. A spool 3 which is stepped in radial direction receives a winding of the magnetic coil 1 and, in combination with the core 2 which has a constant outside diameter, provides a particularly compact construction of the injection valve in the region of the magnetic coil 1.

A tubular metallic intermediate part 12 is connected, for instance by welding, to a lower end 9 of the core 2 concentric to the valve longitudinal axis 10, and partially surrounding the core end 9 axially. The stepped spool 3 grips in part over the core 2 and, by means of a step 15 of larger diameter, grips at least partially axially over the intermediate part 12. Downstream of the spool 3 and of the intermediate part 12 there extends a tubular valve-seat support 16 which is, for instance, firmly attached to the intermediate part 12. Within the valve-seat holder 16 there is a lengthwise bore 17 which is developed concentric to the longitudinal axis 10 of the valve. A valve needle 19 of, for instance, tubular shape is arranged in the longitudinal bore 7, it being attached by, for instance, welding at its downstream end 20 to a spherical valve closure member 21 on the circumference of which there are provided for instance five flats 22 for the fuel to flow past.

The actuating of the injection valve is effected electromagnetically in known manner. For the axial movement of the valve needle 19, and thus for the opening of the injection valve in opposition to the spring force of a restoring spring 25, and for the closing of the injection valve, there is employed the electromagnetic circuit having the magnetic coil 1, the core 2, and an armature 27. The armature 27 is attached to the end of the valve needle 19 facing away from the valve closure member 21 by a first weld seam 28 and is directed towards the core 2. In the downstream end of the valve-seat holder 16 facing away from the core 2, a cylindrical valve-seat member 29 which has a fixed valve seat is tightly mounted by welding in the longitudinal bore 17.

A guide opening 32 in the valve seat member 29 serves for the guiding of the valve closure member 21 during the axial movement of the valve needle 19 with the armature 27 along the valve longitudinal axis 10. The spherical valve closure member 21 cooperates with the valve seat of the valve seat member 29, the seat tapering in frustoconical shape in the direction of flow. The circumference of the valve seat member 29 has a slightly smaller diameter than the longitudinal bore 17 of the valve-seat holder 16. At its end facing away from the valve closure member 21, the valve seat member 29 is firmly attached, for instance by a surrounding, tight second weld seam 37, developed for instance by means of a laser, concentrically to an orifice disk 34, which, for instance, is developed in cup shape. The cup-shaped orifice disk 34 has a surrounding, downstream-extending holding edge 40 in addition to a bottom part 38 to which the valve seat member 29 is fastened and in which at least one spray opening extends. The spray opening is developed, for instance, by erosion or punching. The holding edge 40 is bent conically outward downstream so that it rests against the inner wall, determined by the longitudinal bore 17, of the valve-seat holder 16, radial pressing being present.

Direct flow of the fuel into an intake line of the internal combustion engine outside the spray openings 39 is avoided also by a third weld seam 41 between spray-hold disk 34 and valve-seat holder 16. On the circumference of the valve-seat holder 16, on the end thereof lying downstream and facing away from the core 2, there is arranged a protective cap 43, which is connected by, for instance, a detent engagement with the valve-seat holder 16.

A depth of insertion of the valve-seat member 29 with the cup-shaped orifice disk 34 determines the preadjustment of the stroke for the valve needle 19. In this connection, the one end position of the valve needle 19 when the magnetic coil 1 is not energized is fixed by the application of the valve closure member 21 against the valve seat of the valve-seat member 29, while the other end position of the valve needle 19 is obtained, when the magnetic coil 1 is energized, by the resting of the armature 27 against the end 9 of the core.

The magnetic coil 1 is surrounded by at least one guide element 45, which is developed, for instance, as a yoke and serves as ferromagnetic element. The guide element at least partially surrounds the magnetic coil 1 in circumferential direction and resting with its one end against the core 2 and with its other end against the valve-seat holder 16 to which it can be connected by, for instance, welding, soldering or bonding.

Adjustment sleeve 48 which is pushed into a flow hole 46 of the core 2 which extends concentric to the longitudinal axis 10 of the valve, the sleeve being developed for instance from rolled spring-steel sheet, serves for adjusting the initial tension of the restoring spring 25 which rests against the adjustment sleeve 48 and the opposite side of which rests against the valve needle 19.

The injection valve is substantially surrounded by a plastic covering 50 which, starting from the core 2, extends in axial direction over the magnetic coil 1 and the at least one guide element 45 up to the valve-seat holder 16, said at least one guide element 45 being covered completely axially and in circumferential direction. This plastic covering 50 includes, for instance, an electric connection plug 52 which is molded thereon.

The plastic covering 50, at its side which lies away from the valve closure member 21, forms a side surface 54 of an annular groove 56 which is provided on the circumference of the feed end 55 of the core 2. A groove bottom 57 of the annular groove 56 which has an upper sealing ring 58 is formed by the circumference of the core 2. The limitation of the annular groove 56 which is opposite the side surface 54 is produced by a holding collar 60 made of plastic which is developed in one piece with a fuel filter 61. The fuel filter according to the present invention extends into the flow hole 46 of the core 2 at its feed end 55 and filters out of those components of the fuel which, due to their size, could cause clogging of the injection valve or damage to it.

The radially outward facing holding collar 60, which forms a side surface of the annular groove 56 of the sealing ring 58, lies, after the mounting of the fuel filter 61, for instance directly on an end surface 63 of the feed end 55 of the core 2, or forms a slight axial gap from the end surface 63. In order to obtain this installed condition, it is necessary by means of a tool to produce a very slight force acting in axial direction along the longitudinal axis 10 of the valve on the fuel filter 61, whereby a nose 65 on the holding collar 60 can engage into a groove 66 on the circumference of the core 2. The pressing force to be applied is so slight that it could easily be produced by the finger of one's hand. The mounting of the fuel filter 61 according to the present invention has the particular advantage that no abrasion can take place within the core 2. Due to the detent engagement of the nose 65 of the holding collar 60 on the outer circumference of the core 2, the fuel filter 61 need not be forced into the flow hole 46 of the core 2, with its concomitant disadvantage of scraping. Instead of this, between a base body 67 of the fuel filter 61 which extends axially in the direction of the longitudinal axis 10 of the valve and the wall of the flow hole 46 of the core 2 up to a shoulder 69 on the base body 67, there is a clearance fit, while the part of the fuel filter 61 lying downstream of the shoulder 69 extends, free of contact, within the flow hole 46 with a clear spacing from the wall of the core 2.

Figure 2:
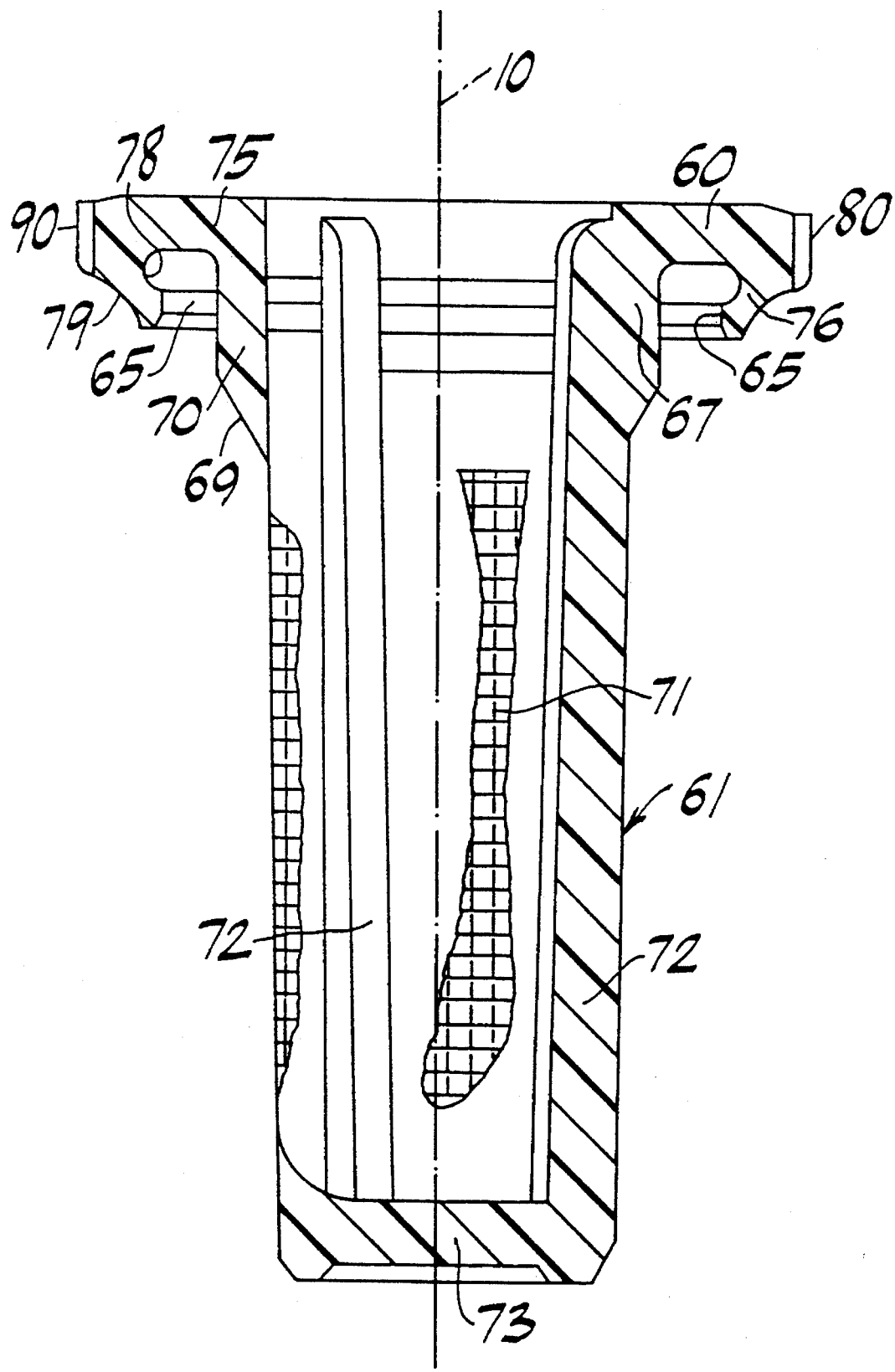
FIG. 2 shows a fuel filter as an individual structural part.

FIG. 2 is a detailed view of the fuel filter 61 of the invention with its plastic holding collar 60 for simplified and improved installation, for instance, in injection valves. The outward extending holding collar 60 forms the upstream end of the fuel filter 61 and passes, in the direction of the longitudinal axis 10 of the valve, which is identical to a filter longitudinal axis, into the base body 67 of plastic. The base body 67 of the fuel filter 61 is formed, for instance, of a solid section 70 which terminates downstream in the shoulder 69, of a filter element 71 of a known polyamide fabric which is molded on in the fuel filter 61 upon the production of the base body 67 and then lies free downward of the shoulder 69, of, for instance, three webs 72 which extend in the axial direction and are distributed 120° apart over the circumference of the fuel filter 61, which webs thus minimally cover the filter element 71, and of a radially extending bottom 73 which provides the downstream closure of the fuel filter 61 at which the filter element 71 and the webs 72 end.

In accordance with the present invention, the holding collar 60 of the fuel filter 61 makes a holding function of the fuel filter 61 on the injection valve and a securing and holding function for the upper sealing ring 58 possible. The outward facing holding collar 60 contains for instance a radial section 75 which radially adjoins the solid section 70 of the base member 67 and an axial section 76, which points toward the filter element 71 and extends as a whole for instance obliquely in the direction of the longitudinal axis 10 of the valve and terminates with the nose 65 which extends parallel to the radial section 75 and is directed towards the valve longitudinal axis 10. A reduction, for instance in the form of an inner curvature 78, in the wall thickness between the radial section 75 and the nose 65 of the axial section 76 sees to it that the circumferential nose 65 is movable in radial direction. In this way, a brief spreading apart is assured upon the pressing of the fuel filter 61 on the core 2 until it engages in the circumferential groove 66 on the circumference of the core 2. The outward facing surface of the axial section 76 can also be rounded, namely with an outer curvature 79, which assures an improved reception of the sealing ring 58 having a circular cross section. The holding collar 60 can of course also have a contour different from that described. The decisive factor, to be sure, is that the holding collar 60 be developed as a single piece with the fuel filter 61 and fulfills the functions of holding the fuel filter 61 by a nose and of holding the sealing ring 58 by a section which extends radially beyond the core 2.

The fuel filter 61 according the present invention, in addition to permitting simple mounting, also permits removal of the fuel filter 61, which is either impossible in the known injection valves having forced-in fuel filters or only possible with unavoidable scrapings. Using a simple mechanical tool, for instance a claw, the nose 65 of the fuel filter 61 can be lifted, without damage, out of the groove 66 and thus the entire fuel filter 61 taken out of the core 2 of the injection valve. This process does not result in any damage to either the fuel filter 61 or the core 2. Nor is there any danger of dirtying the inside of the core 2, since the tool acts outside the core.

Another advantage of the fuel filter 61 according to the present invention is that the fuel filter 61 can be installed in pin-pointed position with a very high degree of precision due to the groove 66 arranged on the core 2. This position is not achieved with such accuracy in the case of the forcing-in of the fuel filter 61 in known injection valves. From a manufacturing standpoint it is also advantageous that the sprue 90 upon the injection molding of the plastic body of the fuel filter 61 can be arranged on the outer radial edge 80 of the subsequent holding collar 60. As a result, the sprue 90 is located in a region which, in installed condition, need not fulfill any function and which lies outside the core 2. In contrast, in known fuel filters the sprue is located on the so-called clean side and therefore in the inner region.

Figure 3:
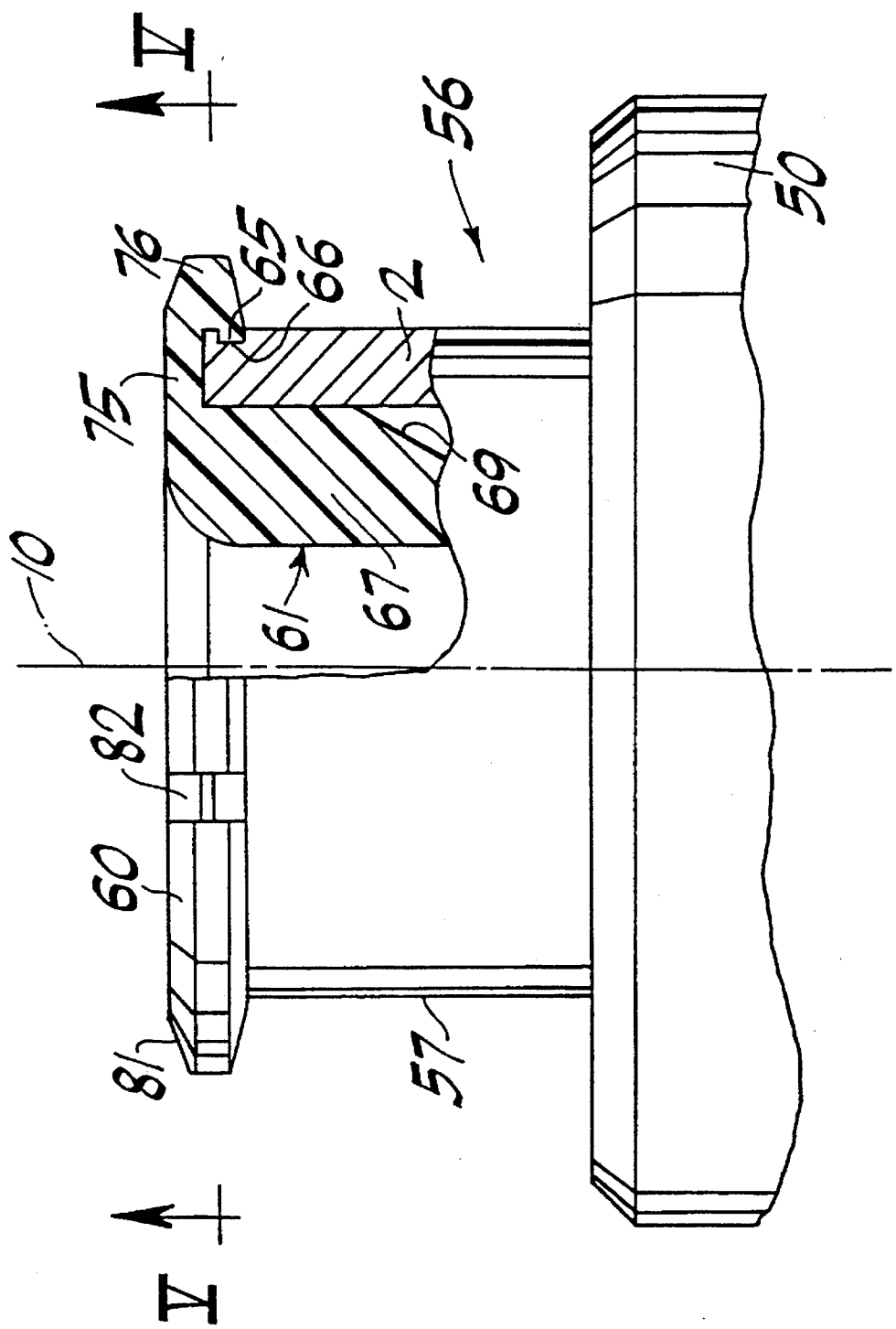
FIG. 3 is an enlarged view of the place of fastening of the fuel filter on the fuel inlet connection.

FIG. 3 shows, in a simplified manner, the region of the engagement of the fuel filter 61 on the core 2 of the injection valve. In this case, the holding collar 60 is developed in somewhat modified form as compared with the first embodiment. This holding collar 60 also provides, by means of the nose 65, a simple, detachable and nevertheless pin-pointed attachment of the fuel filter 61 on the core 2. Furthermore, the radial section 75 of the axial section 76 assures a good seat of the sealing ring 58 (not shown) in the annular groove 56. The connecting surfaces between the radial section 75, the axial section 76, and the nose 65 are developed substantially flat in this embodiment, the transitions losing their sharp-edged nature by, for instance, bevels 81.

Figure 4:
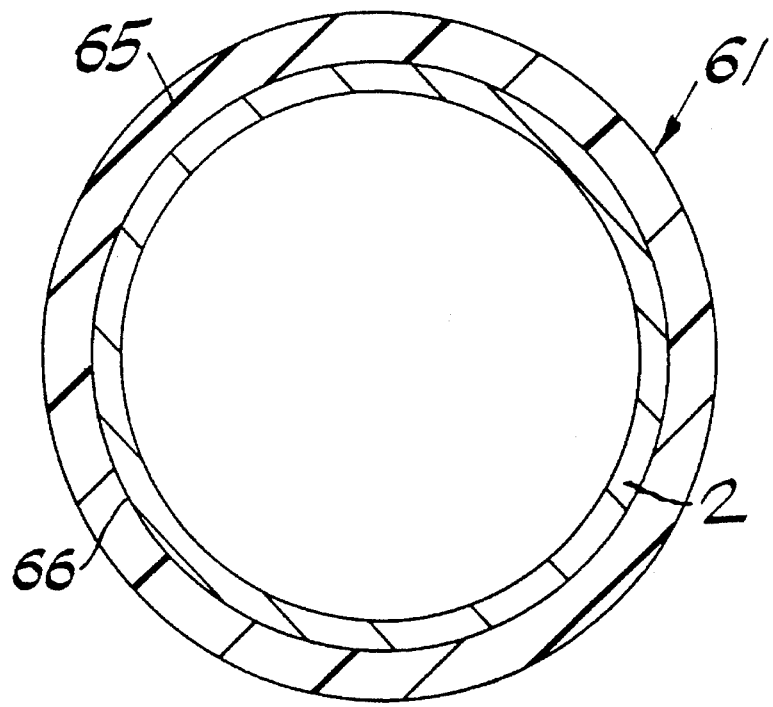
FIG. 4 shows a cross-sectional view along the line IV—IV shown in FIG. 1.
Figure 5:
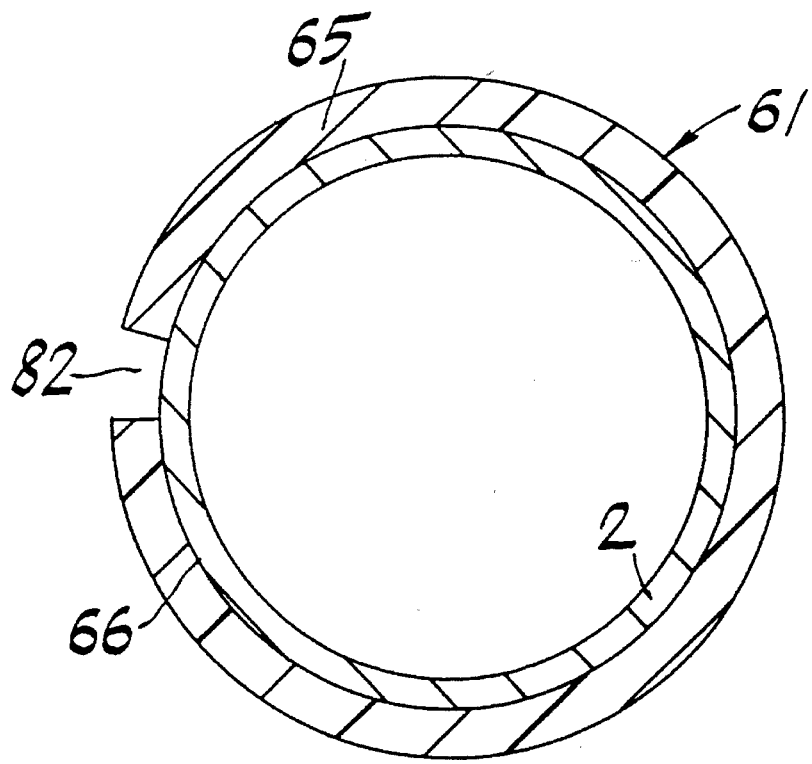
FIG. 5 shows a cross-sectional view along the line V—V shown in FIG. 3.

It is not necessary for the radial section 75, the axial section 76, and the nose 65 to be completely circumferential, as shown in FIG. 4 as shown in FIG. 5, they can also be interrupted by axially extending radial grooves 82, so that the radial section 75, the axial section 76, and the nose 65 do not extend over 360° and are formed for instance by a plurality of segments.

What is claimed is:

1. A fuel injection valve, for fuel injection systems of internal combustion engines, comprising:

a fuel inlet connection, the fuel inlet connection having a cylindrical portion including a cylindrical outer surface and a cylindrical inner bore, the cylindrical portion including an open end face communicating with the bore, the cylindrical outer surface having a first annular groove proximate the end face; and a fuel filter positioned within the bore and having a collar that is positioned adjacent the end face and extending radially outward beyond a juncture of an outer periphery of the end face and the cylindrical outer surface, the collar including an axial portion extending axially in a direction of the first annular groove, the axial portion having a nose portion extending radially inwardly into the first annular groove to form a detent connection for releasably attaching the filter to the fuel inlet connection.

2. The fuel injection valve according to claim 1, wherein the nose of the collar and the first annular groove on the fuel inlet connection extends 360° around the cylindrical outer surface.

3. The fuel injection valve according to claim 1, wherein the filter includes a base body, the base body and the collar of the fuel filter being made of plastic, and a filter element of the fuel filter includes a polyamide element.

4. The fuel injection valve according to claim 3, wherein upon injection molding of the base body and the collar of the fuel filter, a sprue of injection molding from a manufacture of the fuel filter is arranged in a region of the fuel filter which, after the mounting of the fuel filter in the fuel inlet connection, lies outside the inner bore of the fuel inlet connection.

5. The fuel injection valve according to claim 1, wherein the axial portion of the collar is limited by an inner curvature facing toward the fuel inlet connection and by an outer curvature facing away from the fuel inlet connection.

6. The fuel injection valve according to claim 1, wherein the collar includes at least one groove extending radially and axially therethrough, the groove intersecting the nose so that the nose has at least one gap therein and extends less than 360° around the cylindrical outer surface.

7. The fuel injection valve according to claim 1, wherein a portion of the collar which extends radially outward beyond said juncture at least partially delimits a second annular groove formed by the cylindrical outer surface of the fuel inlet connection for a sealing ring.

8. The fuel injection valve according to claim 1, wherein the filter includes a base body, the base body being positioned within the bore of the fuel inlet connection, a clearance fit being provided between the base body and an inner surface of the bore.

* * * * *